Aug. 18, 1964   D. J. ROSENBERG   3,144,850
GAS DETECTING METHOD AND APPARATUS
Filed April 25, 1962   2 Sheets-Sheet 1
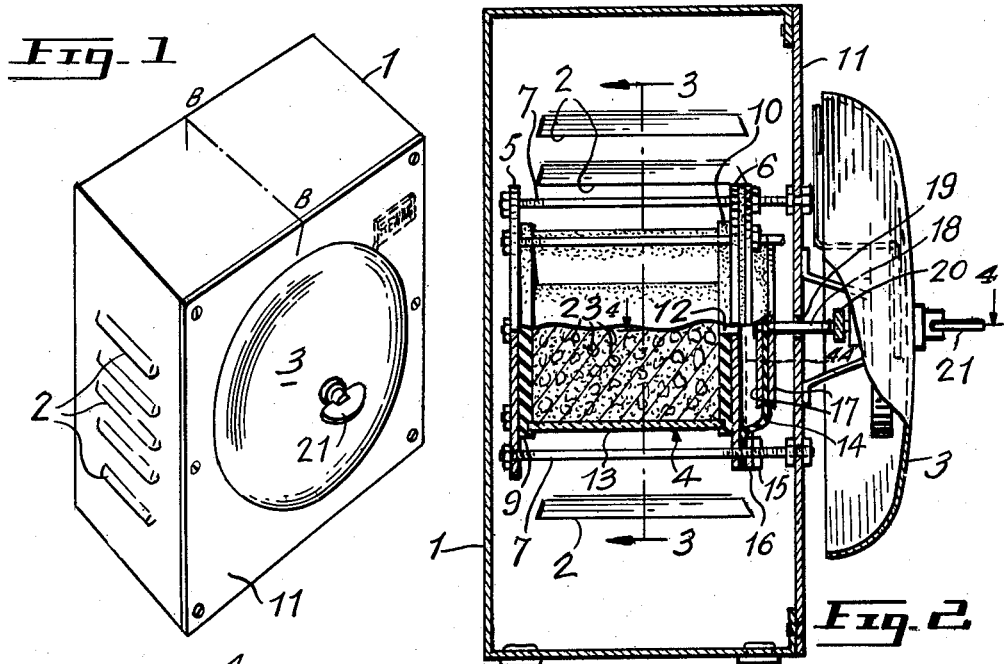
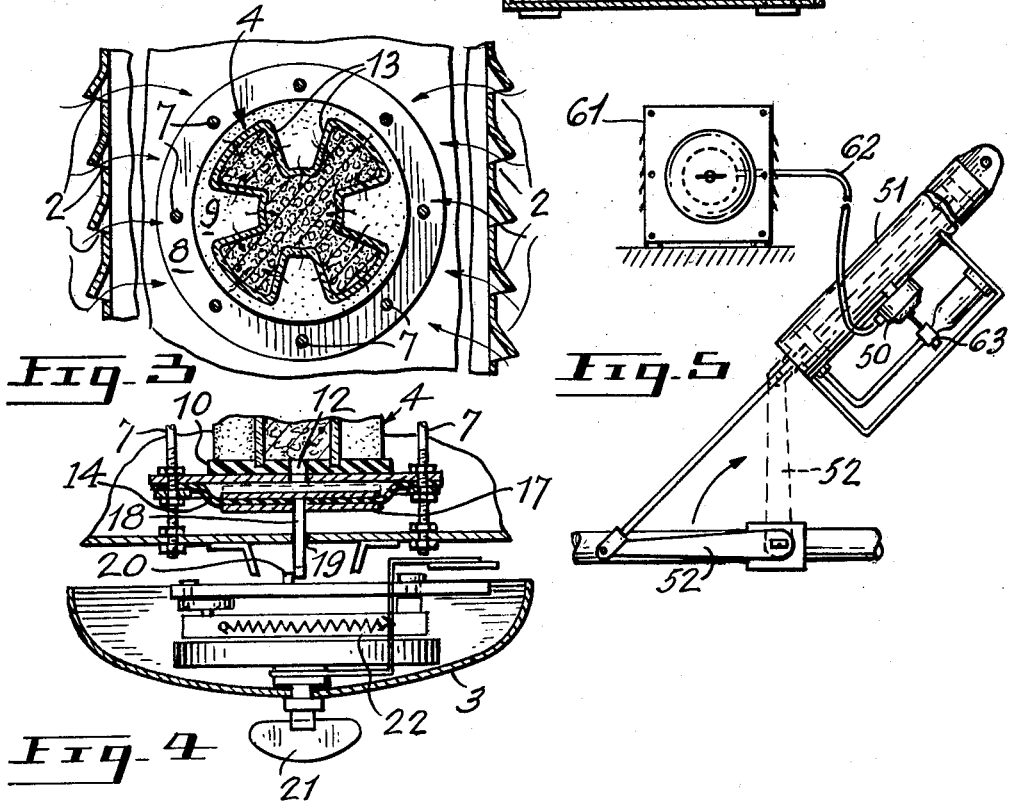

Aug. 18, 1964     D. J. ROSENBERG     3,144,850
GAS DETECTING METHOD AND APPARATUS

Filed April 25, 1962     2 Sheets-Sheet 2

UNIT A     UNIT B 3,144,850
GAS DETECTING METHOD AND APPARATUS
David J. Rosenberg, Glen Cove, N.Y., assignor to Pall Corporation, Glen Cove, N.Y., a corporation of New York
Filed Apr. 25, 1962, Ser. No. 191,681
4 Claims. (Cl. 116—67)

This invention relates to a method and apparatus for detecting the presence of one or more gases in a mixture of gases. In a preferred embodiment, this invention relates to a method and apparatus for detecting the presence of noxious gases in air.

There have been many types of gas detecting devices in use heretofore. A great many of them involve the use of electrical elements. Although such electrical devices are satisfactory for some uses, they are unsatisfactory for use where the gas to be detected can form an explosive mixture since any sparks developed in the detecting device could ignite the gas. The use of mechanical gas detecting devices has heretofore been suggested. Such devices have in the past made use of osmotic pressure but it has been generally found that osmotic pressure is not sufficient to set off a mechanical alarm, especially when the quantity of gas being detected is very small.

The present invention uses a mechanical means for signaling the presence of the gas being detected but does not rely upon osmotic pressure. Instead it relies upon the ability of sorbents to preferentially sorb certain gases as opposed to others contained in a mixture of gases coming into contact therewith. When the sorbent is contained within a relatively confined area, the gas pressure within the confined area will be decreased by the amount of the partial pressure of the sorbed gas. A flexible diaphragm positioned in communicative relationship with the confined sorbing area will respond to the diminution of pressure by bending in the direction of said sorbing area. The flexible diaphragm is so positioned as to actuate a mechanical warning device, such as a spring operated bell or the like. The flexible diaphragm can be made either to prevent the operation of the warning while in its normal position, or to directly cause the warning device to be actuated.

By the method of this invention, it is possible to arrange the diaphragm and/or the sorbing material so as to actuate the warning below certain prearranged gas concentrations. Alternatively, the movement of the flexible diaphragm can be used to actuate a mechanism such as a gas shut-off valve.

Although this invention is particularly useful for detecting the presence of hazardous gases such as methane or hydrogen sulfide in air, it is not necessarily so limited. It can be used in conjunction with a mixture of other gases which are likely to become contaminated in an undesirable manner. For example, it can be used in a methane storage tank using a sorbent material capable of sorbing either oxygen or nitrogen so that the apparatus would be capable of detecting and warning of the presence of air in the tank.

A typical apparatus used in practicing this invention consists of a unit having one surface permeable to the free passage of gas from the surrounding medium and containing therein a quantity of a suitable sorbent material. In communicative relation with this unit is a flexible diaphragm positioned so as to have one surface at the same pressure as the pressure within the sorbing area. The other side of the flexible diaphragm should be exposed to a predetermined constant pressure as, for example, atmospheric pressure. A mechanical indicating or sensing device can be in contact with the flexible diaphragm and be so arranged that when the diaphragm is deflected from its normal position beyond a predetermined amount, the mechanical indicating or sensing device will be actuated, thus giving a warning or otherwise performing its function.

The sorbent material can be of any type known to the art for use in sorbing particular gases from mixtures of gases. The term "sorption" is used in the art to denote the process of removing molecules of a gas from the gas phase and is inclusive of the processes known as "adsorption" and "absorption," the distinction being that molecules are said to be "absorbed" when they enter the inside of a solid material, i.e., the "absorbent" and are said to be "adsorbed" when the gas molecules remain attached to the surface of the solid "adsorbent."

It is known that sorbents usually have a preferential attraction for particular gas molecules. Accordingly, the sorbent is selected to sorb the particular gas to be detected. For example, where hydrogen or hydrocarbon contaminants are expected to be present in air, and their presence is to be detected, activated charcoal alone or in conjunction with 0.2 to 5% of palladium can be employed. Activated charcoal will preferentially sorb such gases as propane, butane and pentane without having any significant sorbing effect upon the nitrogen and oxygen constituents of air. For other applications, other sorbents can be used. Additional data on the theory of sorbents, necessary quantities of sorbents to sorb particular quantities of gases and related matters can be found in "The Adsorption of Gases and Vapors," volume 1, by Brunauer (Princeton University Press, 1943) and in Chapter III of "Surface Chemistry Theory and Applications" by Bikerman, Second Edition (Academic Press, 1958). Suitable examples of sorbents for use in connection with various gases include activated carbon either alone or catalyzed with from about 0.2 to 5% of palladium, platinum, rhodium, cesium, rubidium or cuprous oxide. Activated carbon is also increased in activity by the addition of from about 5 to 20% by weight of a mixture of the oxides of copper, cobalt, manganese and silver, commercially known as Hopcolite.

Many other materials known to the art can be used for sorbing various gases from various gas mixtures including crystals of lead sulfate, lead chromate, lead chloride, lead sulfide, barium sulfate, strontium sulfate, calcium sulfate, bismuth sulfide, bismuth phosphate, zirconium silicate and copper sulfate. Other suitable sorbent materials include chabacite, pumice, either alone or catalyzed with up to 10% nickel, silica gel, chromic oxide gel, lithopone, powdered porous glass, glass wool, activated alumina, quartz crystals and such naturally occurring sorbent materials as fuller's earth, Cecil Soil, Barnes Soil and glaucosil. Although solid sorbents are substantially preferred, liquid sorbents can also be used for particular applications. An example of a liquid sorbent is glycerine which is capable of absorbing moisture in air and can be used, for example, for applications when it is essential to detect quantities of moisture contaminating bone dry air.

It is preferable that the sorbent employed have a large surface area exposed to the passage of gases. Accordingly, it is preferred that the solid sorbents be in particulate form and not be compressed.

The sorbent material should be located within a confined area which is permeable to the free passage of the gases being tested for the presence of the detectable gas. The sorbing material should be located between the gas inlet and the communication between the confined area and the flexible diaphragm. Preferably the confined area should have walls of a character that will increase the exposure of gases to the sorbent materials. It has been found that walls having a rough surface such as walls of unglazed earthenware or chalky clay give the best results. However, a confined area having smooth surface walls can also be used in many applications.

There must be an opening in the confined area permitting the reduced pressure caused by sorption of gas to be transmitted to the flexible diaphragm. This opening can be very small or it can be a tube of a very considerable length.

The flexible diaphragm employed in this invention to respond to the decrease in pressure of the gases above the sorbing area should be substantially impervious to air at the pressure differentials expected to be present in the system. The nature of the material used to fabricate the flexible means will depend upon the ultimate properties desired. Where it is necessary that a very small quantity of gas be detected, the material must be of a type that is very sensitive to small changes in pressure. Thin plastic films such as polyvinyl chloride or polyethylene films could be employed. Heavier grades of plastic sheeting could be used where the sensitivity of the apparatus need not be quite so great. Where it is desired that the apparatus not be sensitive to very small concentrations of the gas to be detected, a metal diaphragm could be used such as one made of tin, aluminum or copper foil. Metal plates can be attached to the flexible diaphragm if desired in order to reinforce it at those points where it is to be in contact with the warning device.

The warning device activated by deflection of the flexible diaphragm can be any of the conventional spring-operated bells or buzzers such as those conventionally used on a spring wound alarm clock. Alternatively, the warning device can be a flag or other visual indicator that is caused to change its position when the flexible diaphragm is deflected or a button that is released to emerge from a housing, due to withdrawal of an attracting magnet, as in U.S. Patent No. 2,942,572.

Further details on the method and apparatus of this invention can be had by reference to the drawings in which FIGURE 1 is a perspective view of the exterior of a detecting device in accordance with this invention;

FIGURE 2 is an enlarged vertical section through the plane B—B of the apparatus of FIGURE 1, with appropriate portions broken away to show the sorbent, the flexible diaphragm and the means for actuating the warning alarm;

FIGURE 3 is a section taken along line 3—3 of FIGURE 2;

FIGURE 4 is a section taken along line 4—4 of FIGURE 2;

FIGURE 5 shows on a reduced scale the device in use as part of safety equipment.

Figure 6:
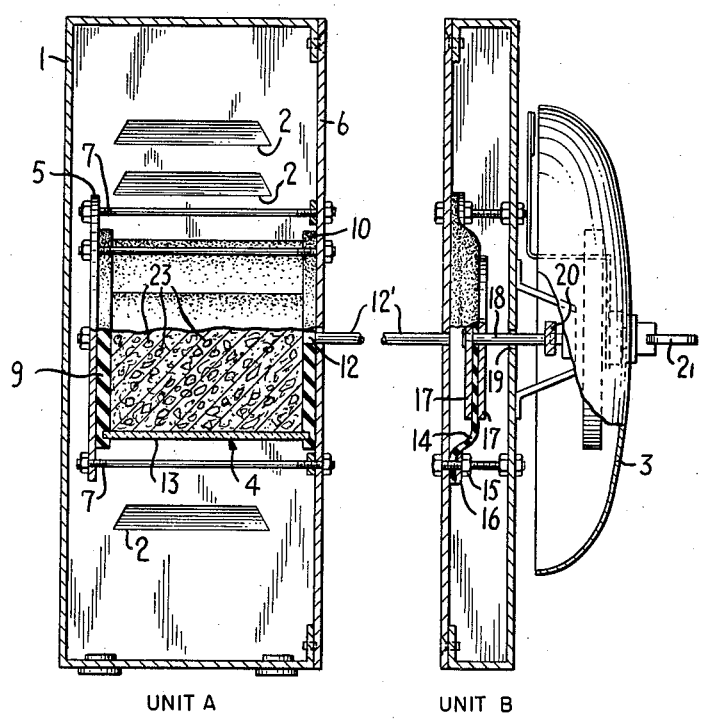
FIGURE 6 is a sectional view equivalent to FIGURE 2 showing an alternative embodiment of this invention in which the flexible diaphragm and warning mechanism are remote from the sorbing area.

The assembly illustrated in FIGURE 1 comprises a housing 1, louvered at 2, and having a bell or alarm member 3 mounted thereon.

A porous-walled chamber 4 cruciform in cross-section (see FIGURE 3), is mounted between paired steel rings or plates 5 and 6. Bolts 7 passing through suitable holes in the flanges 8 on the plates 5 and 6 serve to secure the plates against the top and bottom walls of the chamber 4. The same bolts extend through one of the walls 11 of the housing 1 whereby the entire chamber assembly is suspended within the housing 1.

The bottom wall 9 of chamber 4 is solid, the top wall 10 has a small aperture shown at 12 (FIGURES 2 and 4). The side-walls 13 of chamber 4 are convoluted in such a way as to present the maximum of surface area to gases approaching the chamber, the side-walls 13 being made of a suitable porous material such as unglazed porcelain, set into walls 9 and 10 which may be made of metal, plastic or rubber.

A flexible diaphragm 14 is spaced from the top wall 10 of chamber 4, and secured in gas-tight relationship to the flange 8 on steel plate 6 by means of nuts 15 and washers 16. A second chamber 4A is formed between the flexible diaphragm 14 and top wall 10 and plate 6. One or more rigid metal or plastic discs 17 are secured against the diaphragm 14, for example by means of adhesive, and serve to stiffen the diaphragm thereby increasing the force exerted by the flexible diaphragm on the warning device.

A sear-pin 18 extends at right angles away from diaphragm 14, the pin being secured by one of its ends to disc 17 by suitable means. The pin 18 passes through an aperture 19 in wall 11 so that its opposite end serves as a retaining member for the alarm-release 20 on the bell 3, the bell being of the conventional mechanical variety with wind-up device 21 serving as tensioning means for spring 22.

Chamber 4 is filled with a sorbent material such as the Hopcolite-sensitized activated carbon particles shown at 23.

The device operates as follows: air in admixture with undesirable gas approaches the assembly 1, passing through the louvres 2. The gas molecules pass through the porous side-walls 13 of chamber 4 where they are quickly absorbed by the sensitized activated carbon thus reducing the pressure within the chamber as described above. With the pressure reduced within the chamber, atmospheric pressure pushes the membrane 14 inwardly thereby depressing sear-pin 18 and releasing the alarm.

In a modification of this invention illustrated in section in FIGURE 6, the apparatus is divided into two units, A and B, connected by means of a long, gas-impervious tube 12' having a small interior diameter, preferably less than about one-quarter inch. Tube 12' is generally not more than about 1500 feet in length and preferably is not longer than about 1000 feet. Unit A is equivalent to the left hand portion of FIGURE 2 and contains the sorbent chamber 4. Unit B is equivalent to the right hand portion of the FIGURE 2 apparatus and contains the flexible diaphragm 14 and the warning device 3. Like numerals in FIGURE 6 are identical with their counterparts in FIGURE 2.

In operation the gas mixture passes into Unit A. The gas to be detected is sorbed by the sorbent contained therein. The reduced pressure within Unit A is communicated to long tube 12' and thus to one face of diaphragm 14. Since the opposite face of the diaphragm is exposed to atmospheric pressure, the membrane will be deflected, thereby depressing sear-pin 18 and releasing the alarm.

This modification is particularly useful in that Unit A can be positioned within the testing area, but Unit B, which gives the actual warning, need not be positioned there but can be positioned in a place of comparative safety as, for example, in a watchman's quarters. A series of Unit A portions can, for example, be positioned throughout a factory or other large area all communicating by means of long lengths of tubing 12' to a plurality of Units B located in a central control booth. By varying the sorbent employed in the various Units A, it is possible in this manner to detect differences in concentration of a particular gas in various areas, or, alternatively, to warn of the presence of several different gases in a particular area.

FIGURE 5 illustrates a method of using the principles of this invention to directly shut off a gas supply. Unit 61 of FIGURE 5 can be positioned in the top of a reactor such as a reactor used to prepare aqueous saturated solutions of hydrosulfuric acid by admitting hydrogen sulfide gas into the bottom of the reactor. Unit 61 is equivalent to the Unit A of FIGURE 6 and contains a sorbent for hydrogen sulfide. Tube 62 communicates between the sorbing area of Unit 61 and a flexible diaphragm contained in Unit 50. The flexible diaphragm is arranged so that when it deflects due to a decrease in pressure, it activates a gas valve 63 which releases gas to cylinder 51 whereby valve arm 52 would be forced upwardly to the position shown by dotted lines in FIGURE 5, thus shutting off the supply of hydrogen sulfide.

This application is a continuation-in-part of my copending application Serial No. 113,206, filed May 29, 1961, now abandoned.

I claim:

1. Apparatus for detecting the presence of a particular gas comprising, in combination, means within a confined area capable of sorbing at least a portion of the gas to be detected, flexible means communicating with said confined area, and a warning means capable of being actuated by the deflection of said flexible means, whereby, when the pressure of the mixture of gases is reduced through sorption of at least a portion of the gas to be detected, the flexible means is deflected, thereby actuating the warning means.

2. A gas-detecting device comprising, in combination, a porous chamber permeable to gases and containing a quantity of sorbent material, a flexible diaphragm communicating with said chamber, a sear-pin secured to said diaphragm, and an alarm controlled by said pin.

3. A gas detecting device for detecting the presence in air of undesirable gas components, said device comprising, in combination, a quantity of sorbent material confined within an open-ended chamber, said chamber being permeable to air and other gases, a pressure-sensitive flexible diaphragm mounted in air-tight relationship across the open end of said chamber, and means engaging said diaphragm and extending approximately at right angles therefrom, communicating with a warning device.

4. A gas detecting device for detecting the presence in air of undesirable gas components, said device comprising in combination an open-ended gas- and air-permeable porous chamber, a perforated metal plate mounted across the open end of said chamber, an annular flange on said metal plate, a pressure-sensitive flexible diaphragm mounted across said flange, a second chamber formed between said plate and said diaphragm, and a retractable pin secured by one of its ends to said diaphragm, and by its other end to release mechanism on an alarm.

References Cited in the file of this patent
UNITED STATES PATENTS

| | | |
|---|---|---|
| 980,831 | Peterson | Jan. 3, 1911 |
| 1,520,086 | Sanderson | Dec. 23, 1924 |